(12) United States Patent
Chen

(10) Patent No.: US 10,863,085 B2
(45) Date of Patent: Dec. 8, 2020

(54) POSITIONING AND ORIENTING CAMERAS TO EXTEND AN ANGLE OF VIEW

(71) Applicant: HARMAN INTERNATIONAL INDUSTRIES, INCORPORATED, Stamford, CT (US)

(72) Inventor: Mien Chin Chen, Richardson, TX (US)

(73) Assignee: Harman International Industries, Incorporated, Stamford, CT (US)

(*) Notice: Subject to any disclaimer, the term of this patent is extended or adjusted under 35 U.S.C. 154(b) by 0 days.

(21) Appl. No.: 16/289,483

(22) Filed: Feb. 28, 2019

(65) Prior Publication Data

US 2020/0280677 A1  Sep. 3, 2020

(51) Int. Cl.
*H04N 5/232* (2006.01)

(52) U.S. Cl.
CPC ..... *H04N 5/23238* (2013.01); *H04N 5/23216* (2013.01); *H04N 5/23296* (2013.01); *H04N 5/23299* (2018.08)

(58) Field of Classification Search
CPC ........... H04N 5/23238; H04N 5/23299; H04N 5/23216; H04N 5/23296
USPC ........................................................ 348/169
See application file for complete search history.

(56) References Cited

U.S. PATENT DOCUMENTS

| | | | |
|---|---|---|---|
| 2015/0373267 A1* | 12/2015 | Lapstun | H04N 5/247 348/144 |
| 2016/0148062 A1 | 5/2016 | Fursich | |
| 2017/0036771 A1* | 2/2017 | Woodman | B64C 39/024 |
| 2017/0123425 A1* | 5/2017 | Zhao | G05D 1/102 |
| 2017/0131725 A1* | 5/2017 | Aphek | B64C 39/024 |
| 2017/0334357 A1* | 11/2017 | Lewis | G06K 9/3233 |
| 2017/0353658 A1* | 12/2017 | Colin | H04N 5/247 |
| 2018/0186472 A1 | 7/2018 | Wan et al. | |
| 2018/0208311 A1* | 7/2018 | Zhang | B64C 39/024 |
| 2018/0343401 A1* | 11/2018 | Campbell | G08G 5/0069 |

OTHER PUBLICATIONS

Extended European Search Report for application No. 20158299.6 dated May 27, 2020.

\* cited by examiner

*Primary Examiner* — Jared Walker
(74) *Attorney, Agent, or Firm* — Artegis Law Group, LLP

(57) ABSTRACT

In one embodiment, a camera system includes a first camera that has a first camera angle of view and a second camera that has a second camera angle of view. The first camera is positioned and oriented to have a first coverage area and the second camera is positioned and oriented to have a second coverage area that at least partially overlaps the first coverage area. An angle between a center axis of the first camera angle of view and a center axis of the second camera angle of view exceeds the first camera angle of view.

20 Claims, 5 Drawing Sheets

POSITIONING AND ORIENTING CAMERAS TO EXTEND AN ANGLE OF VIEW

BACKGROUND

Field of the Various Embodiments

The various embodiments relate generally to imaging systems and, more specifically, to positioning and orienting cameras to extend an angle of view.

Description of the Related Art

Object detection systems often enable applications to perform a wide variety of navigation-related activities over a 360 degree angle of view surrounding a central object. For example, a speaker could include a steering application that directs an audio signal towards people that are detected around the speaker. In another example, a vehicle could include a driver assistance application that directly or indirectly alters the speed and/or direction of the vehicle based on objects detected around the vehicle. In yet another example, a drone could include a tracking application that tracks detected objects.

A typical object detection system includes at least a camera subsystem and an object detection application. Notably, the distortion associated with a camera having an angle of view that is greater than 90 degrees can unacceptably reduce the accuracy of automated object detection operations. For this reason, each camera included in the camera subsystem typically has an angle of view that is no greater than 90 degrees. Further, because the physical gap between any two cameras creates a blind spot between the two cameras, at least three cameras are typically positioned and oriented to have a combined angle of view that is equal to or greater than 180 degrees.

In one approach to covering a 360 degree angle of view with acceptable accuracy, at least six cameras and a stitching application may be included in the camera subsystem of an object detection system. In such systems, the cameras are typically positioned and oriented to avoid blind spots in a 360 degree combined angle of view. For example, at the front of the central object, three cameras could be positioned and orientated to have a combined angle of view that is 180 degrees. More precisely, a front center camera could point directly away from the central object, a front left camera could point 45 degrees to the left, and a front right camera could point 45 degrees to the right. In a similar fashion, three cameras at the rear of the central object could be positioned and arranged to have a combined angle of view that is 180 degrees. The stitching application interfaces with the different cameras to acquire multiple cameras images. Subsequently, the stitching application performs image processing operations to generate a single panoramic image based on the multiple camera images. Finally, the stitching application stores the panoramic image in an image buffer for processing by the object detection application.

One limitation of this approach is that significant resources are required to interface with six or more cameras and then generate a panoramic image from the images acquired by each camera. Consequently, the amount of processing resources required to detect objects in real-time can exceed processing resources available to a given object detection system. Further, the power consumed by such an object detection system (i.e., cameras, processors, etc.) can exceed a maximum allowable power consumption associated with a desired application, such as a mobile system or in-vehicle system.

As the foregoing illustrates, more effective techniques for detecting objects would be useful.

SUMMARY

One embodiment sets forth a camera system. The camera system includes a first camera having a first camera angle of view, where the first camera is positioned and oriented to have a first coverage area; and a second camera having a second camera angle of view, where the second camera is positioned and oriented to have a second coverage area that at least partially overlaps the first coverage area, where an angle between a center axis of the first camera angle of view and a center axis of the second camera angle of view exceeds the first camera angle of view.

Further embodiments provide, among other things, a method for detecting objects and an object detection system.

At least one advantage of the disclosed systems and techniques is that the number of cameras, the amount of processing resources, and/or the power consumption associated with reliably detecting objects over a combined angle of view are reduced compared to conventional systems and techniques. In particular, arranging pairs of cameras in a crossfire configuration reduces the number of cameras required to detect objects over a combined angle of view that is equal to or greater than 180 degrees without blind spots. Further, performing object detection operations directly on camera images instead of on a panoramic image derived from the camera images reduces the processing resources and power required to detect object(s) that are present in the camera images.

BRIEF DESCRIPTION OF THE DRAWINGS

So that the manner in which the above recited features can be understood in detail, a more particular description of the various embodiments, briefly summarized above, may be had by reference to certain embodiments, some of which are illustrated in the appended drawings. It is to be noted, however, that the appended drawings illustrate only typical embodiments and are therefore not to be considered limiting of scope, for the contemplated embodiments may admit to other equally effective embodiments.

DETAILED DESCRIPTION

In the following description, numerous specific details are set forth to provide a more thorough understanding of the various embodiments. However, it will be apparent to one of skill in the art that various embodiments may be practiced without one or more of these specific details.

Object Detection System

Figure 1:
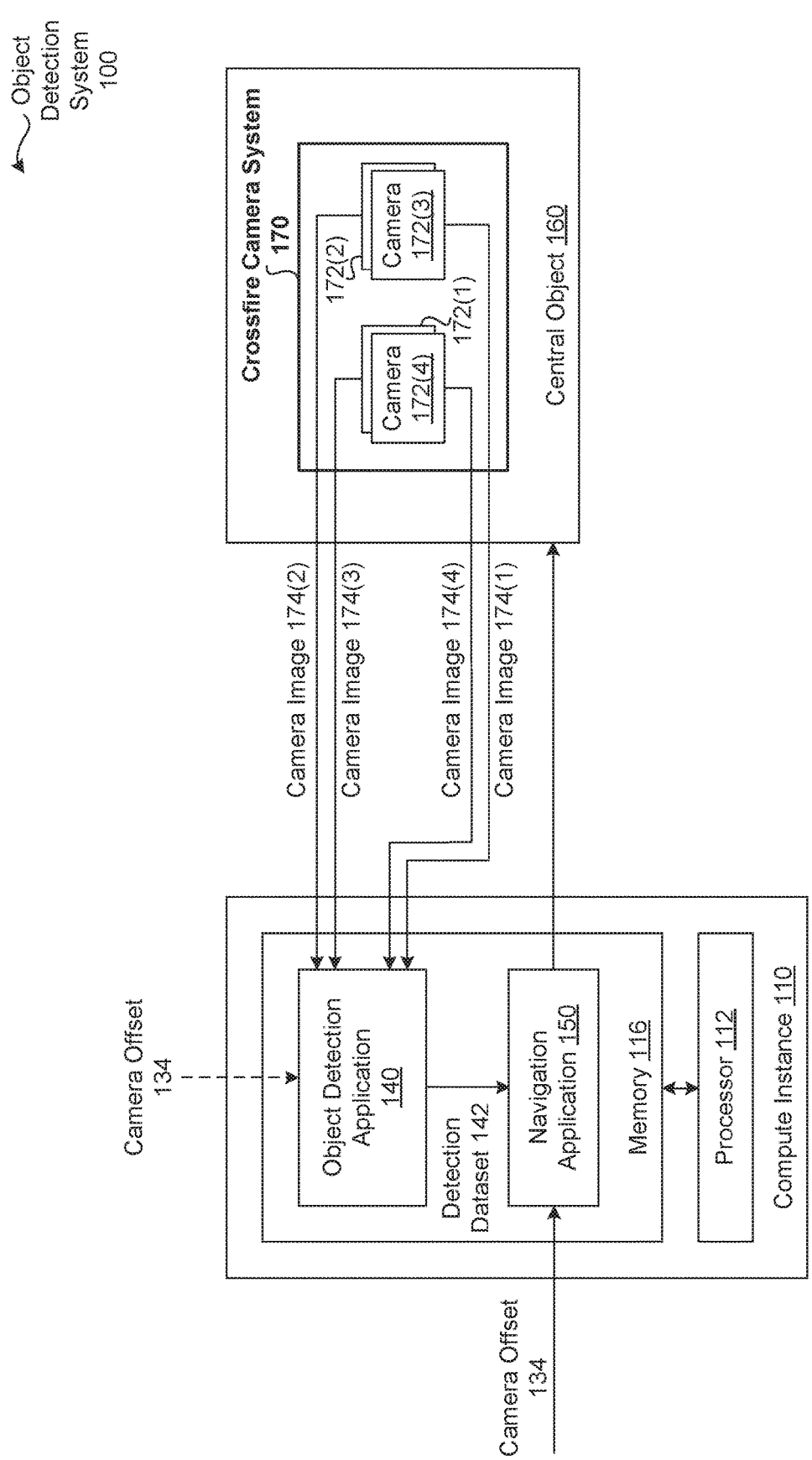
FIG. 1 illustrates an object detection system configured to implement one or more aspects of the various embodiments.

FIG. 1 illustrates an object detection system 100 configured to implement one or more aspects of the various embodiments. As shown, the object detection system 100 includes, without limitation, a compute instance 110 and a central object 160. In alternate embodiments, the object detection system 100 may include any compute instances and any number of central objects 160, in any combination. For explanatory purposes, multiple instances of like objects are denoted with reference numbers identifying the object and parenthetical numbers identifying the instance where needed.

Any number of the components of the object detection system 100 may be distributed across multiple geographic locations or consolidated into a single component. For example, in some embodiments, the compute instance 110 is embedded in the central object 160. Further, any number of applications associated with the object detection system 100 may be included in or distributed across one or more stand-alone devices, distributed computing environments, or cloud computing environments (i.e., encapsulated shared resources, software, data, etc.) in any combination.

The compute instance 110 includes, without limitation, any number of processor(s) 112 and memory 116. Examples of compute instances 110 include, without limitation, a server, a cloud instance, a laptop, a desktop computer, an embedded system-on-a-chip (SOC), etc. Each of the processor(s) 112 may be any instruction execution system, apparatus, or device capable of executing instructions. For example, each of the processor(s) 112 could be a central processing unit (CPU), a graphics processing unit (GPU), a parallel processing unit (PPU), a controller, a microcontroller, a state machine, or any combination thereof.

The memory 116 stores content, such as software applications and data, for use by the processor(s) 112 of the compute instance 110. The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor(s) 112. For example, and without limitation, the storage may include a Secure Digital Card, an external Flash memory, a portable compact disc read-only memory (CD-ROM), an optical storage device, a magnetic storage device, or any suitable combination of the foregoing.

The compute instance 110 is configured to implement one or more applications. For explanatory purposes only, each application and each subsystem is depicted as residing in the memory 116 of a single compute instance 110 and executing on the processor(s) 112 of the single compute instance 110. However, as persons skilled in the art will recognize, the functionality of each application and subsystem may be distributed across any number of other subsystems and/or applications that reside in the memories 116 of any number of the compute instances 110 and execute on any number of the processor(s) 112 of any number of the compute instances 110 in any combination. Further, the functionality of any number of subsystems and/or applications may be consolidated into a single application or subsystem.

In general, the compute instance 110 detects objects in a 360 degree angle of view around the central object 160 and subsequently causes the central object 160 to perform one or more actions based on the detected objects. The central object 160 may be any type of object that is capable of performing one or more actions based on navigation-related data or commands. For instance, in some embodiments, the central object 160 is a steerable speaker that directs audio signals towards detected people. In other embodiments, the central object 160 is a vehicle that performs any amount and type of driver assistance operations (e.g., braking, parallel parking, warning, etc.) based on detected objects. In yet other embodiments, the central object 160 is a drone that performs navigation or targeting operations based on detected objects. In various embodiments, the central object 160 is an embedded device that performs any number and type of sensor fusion operations based, at least in part, on the detected objects.

In one conventional approach to covering a 360 degree angle of view with acceptable accuracy, at least six cameras and a stitching application may be included in the conventional camera subsystem of a conventional object detection system. The stitching application acquires camera images from the cameras and performs image processing operations on the camera images to generate a single panoramic image. Finally, a conventional object detection application performs object detection operations based on the panoramic image.

One limitation of this conventional approach is that significant resources are required to interface with six or more cameras and then generate a panoramic image from the images acquired by each camera. In particular, as persons skilled in the art will recognize, generating the panoramic image typically involves performing, without limitation, distortion-reducing operations, image projection operations, image mapping operations, and image stitching operations. Consequently, the amount of processing resources required to detect objects in real-time can exceed processing resources available to a given object detection system. Further, the power consumed by such a conventional object detection system (i.e., cameras, processors, etc.) can exceed a maximum allowable power consumption associated with a desired application, such as a mobile system or in-vehicle system.

Detecting Objects using a Crossfire Camera System

To reduce the amount of resources required to detect objects over a 360 degree angle of view, the object detection system 100 includes a crossfire camera system 170 that is mounted on the central object 160. The crossfire camera system 170 may be mounted on the central object 160 in any technically feasible fashion. In alternate embodiments, the crossfire camera system 170 may be physically separate from the central object 160 and may be associated with the central object 160 in any technically feasible fashion. As shown, the crossfire camera system 170 includes, without limitation, four cameras 172(1)-174(4). Although not shown in FIG. 1, each of the cameras 172 has an angle of view of 90 degrees and an associated coverage area over which the camera 172 captures images when the camera 172 is in a fixed position and orientation.

Figure 2:
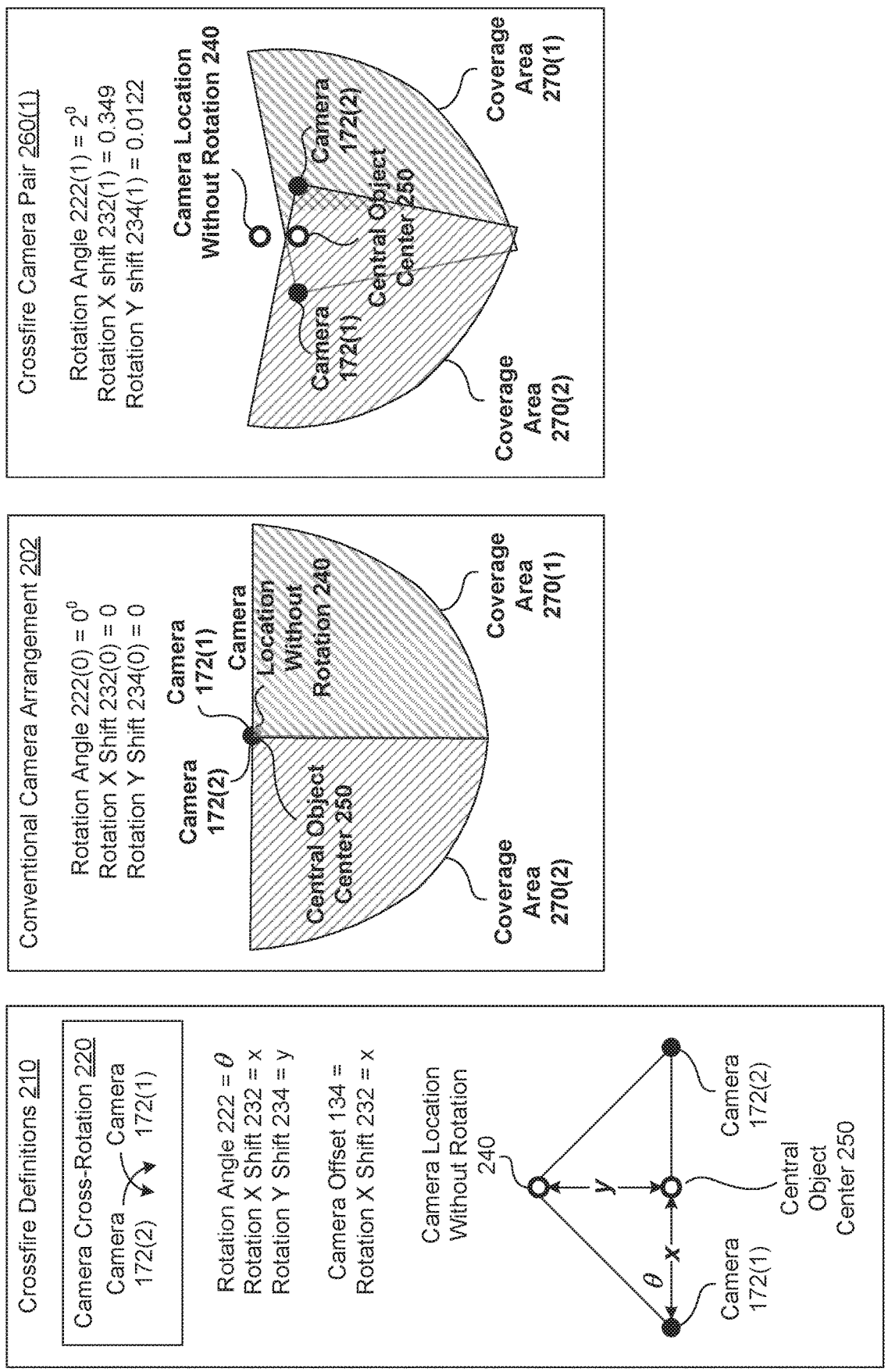
FIG. 2 illustrates an example of a crossfire camera pair included in the crossfire camera system of FIG. 1, according to various embodiments.
Figure 3:
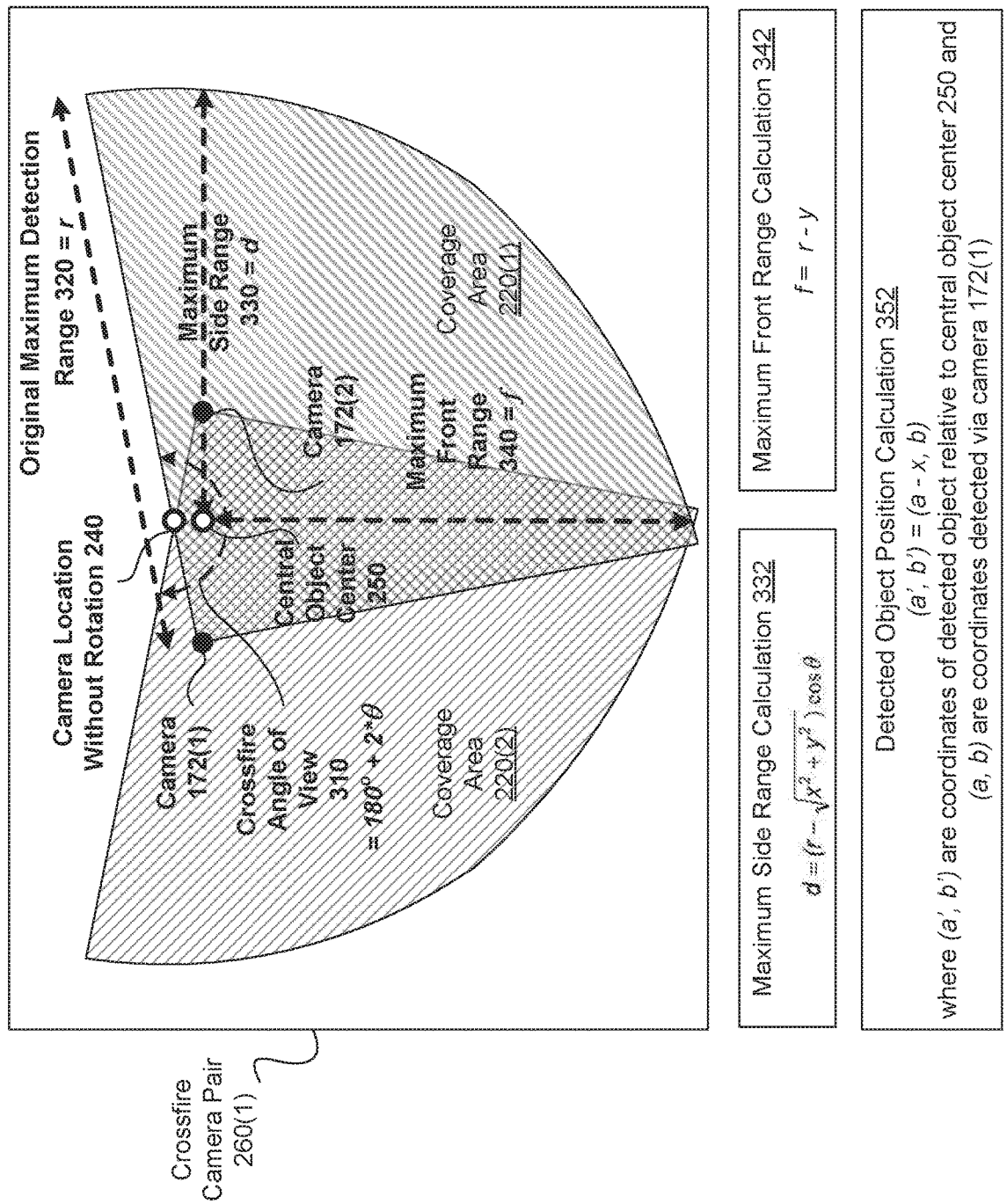
FIG. 3 is a more detailed illustration of the crossfire camera pair of FIG. 2, according to various embodiments.
Figure 4:
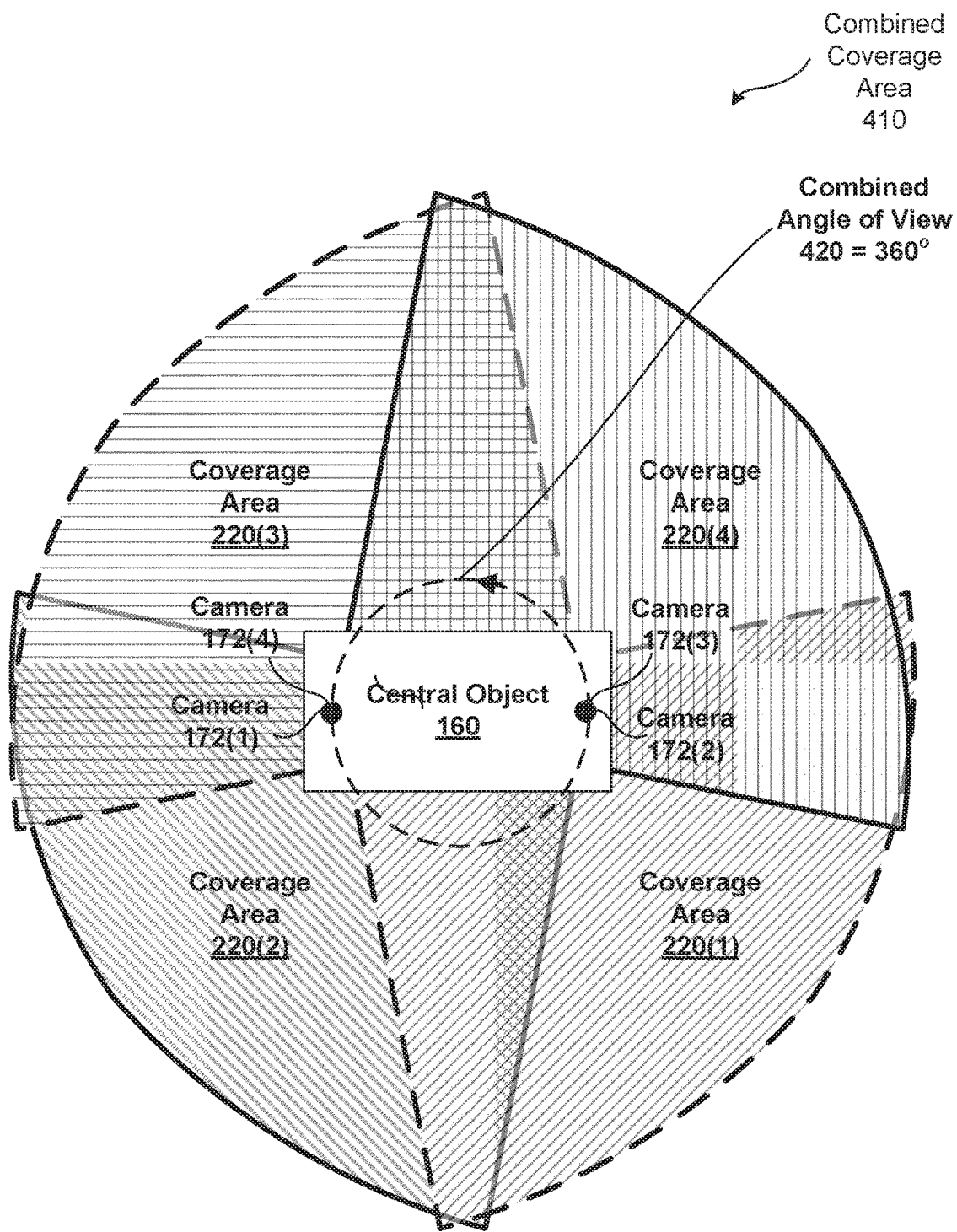
FIG. 4 illustrates an example of a combined coverage area surrounding the central object of FIG. 1, according to various embodiments.

As described in greater detail in conjunction with FIGS. 2 and 3, the cameras 172(1) and 172(2) are positioned and oriented in a crossfire configuration to have a crossfire angle of view that is greater than 180 degrees. Similarly, the cameras 172(3) and 172(4) are positioned and oriented in a crossfire configuration to have a crossfire angle of view that is greater than 180 degrees. In addition, the pair of cameras 172(1) and 172(2) is positioned and oriented on top of the pair of cameras 172(3) and 172(4) such that the cameras 172(1)-172(4) can detect objects in a combined coverage area (not shown in FIG. 1) that has a combined angle of view of 360 degrees. FIG. 4 depicts an example of a combined coverage area that has a combined angle of view of 360 degrees.

When the camera 172(x) and the camera 172(y) are in a crossfire configuration, the coverage area associated with the camera 172(x) crosses over the coverage area associated with the camera 172(y) in a similar fashion to the overlap of weapons fire when the weapons are positioned and oriented in a crossfire configuration. Accordingly, an angle between the center axis of the angle of view of the camera 172(x) and the center axis of the angle of view of the camera 172(y) exceeds the angle of view of the camera 172(x). Advantageously, because the coverage areas associated with the camera 172(x) and 172(y) intercross, the blind spot typically associated with a gap between two cameras included in a conventional camera system is eliminated.

For explanatory purposes only, a pair of cameras 172 that is in a crossfire configuration is referred to herein as a "crossfire camera pair." In alternate embodiments, the crossfire camera system 170 may include any number and type of crossfire camera pairs having any associated angles of view in any combination. The cameras 172 in a crossfire camera pair may be positioned and oriented such that the crossfire camera pair has any technically feasible crossfire angle of view. As referred to herein, a crossfire angle of view for a crossfire camera pair is the union of the angle of views of the two cameras 172 included in the crossfire camera pair. Further, the crossfire camera pairs may be positioned and oriented such that the crossfire camera system 170 has any technically feasible combined coverage area having any combined angle of view. In general, the combined coverage area is the union of the coverage areas associated with the cameras 172 included in the crossfire camera system 170.

For instance, in some alternate embodiments, the crossfire camera system 170 includes, without limitation, a single crossfire camera pair, and each of the cameras 172 in the crossfire camera pair has a 90 degree angle of view. Further, the two cameras 172 are positioned and oriented such that the crossfire camera pair has a crossfire angle of view of 184 degrees. The crossfire camera system 170 also has a combined angle of view of 184 degrees.

In other alternate embodiments, the crossfire camera system 170 includes, without limitation, three crossfire camera pairs, and each of the cameras 172 in each of the crossfire camera pairs has a 60 degree angle of view. Further, the six cameras 172 are positioned and oriented such that each of the crossfire camera pairs has a crossfire angle of view of 124 degrees and the crossfire camera system 170 has a combined angle of view of 360 degrees.

In operation, an object detection application 140 acquires the camera images 174 from the cameras 172 and generates detection data 142. As shown, the object detection application 140 resides in the memory 116 and executes on the processor 112. The object detection application 140 may acquire the camera images 174 in any technically feasible fashion and at any given time. For instance, in some embodiments, each of the cameras 172(x) periodically transmits the associated camera image 174(x) to the object detection application 140. In other embodiments, the object detection application 140 may be configured to copy the camera images 174 from a predetermined memory location based on a detection request.

The object detection application 140 may perform any number and type of operations on the camera images 174 to generate any amount and type of detection data 142. For instance, in some embodiments, the object detection application 140 is a convolutional neural network that is trained to detect the position of each person located within the combined coverage area associated with the crossfire camera system 170. The position of each person is specified relative to the center of the central object 160. The convolution neural network may be trained to detect the position of each person in any technically feasible fashion. For example, the convolution neural network may be trained via a supervised learning process based on multiple camera images 174 and a ground truth dataset.

In other embodiments, the object detection application 140 is a recurrent neural network that is trained to detect the positions and object type (e.g., person, vehicle, road sign) of each object located within the combined coverage area associated with the crossfire camera system 170. The position of each person is specified relative to the center of the central object 160. The recurrent neural network may be trained to detect the position and object type of each object in any technically feasible fashion. For example, the recurrent neural network may be trained via a supervised learning process based on multiple sets of camera images 174 and a ground truth dataset associated with a discrete period of time.

In yet other embodiments, the object detection application 140 may implement any number and type of neural networks trained in any technically feasible fashion and/or any number and type of heuristic algorithms. For instance, in some embodiments, the object detection application 140 may individually input each of the camera images 174 into an object detection neural network to generate four different camera detection datasets. Each different camera detection dataset may specify the position of objects relative to the center object 160 or the associated camera 172 in any technically feasible fashion. The object detection application 140 may then execute any number and type of heuristic algorithms to consolidate the four camera detection datasets into the detection dataset 142.

As a general matter, the object detection application 140 may generate the detection dataset 142 based on the camera images 174 and any amount (including zero) of additional information. Further, the detection dataset 142 may include any amount and type of information associated with any number and type of objects detected in the combined coverage area. For instance, in some embodiments, the object detection application 140 may compute the detection dataset 142 based on the camera images 174 and no additional information. The detection dataset 142 may specify two-dimensional position coordinates for each detected object.

In some alternate embodiments and as depicted with dotted lines in FIG. 1, the object detection application 140 may compute the detection dataset 142 based on the camera images 174 and a camera offset 134. The detection dataset 142 may specify three-dimensional position coordinates for each detected person, where one of the coordinates specifies an estimated distance between the detected person and the center of the central object 160. The camera offset 134 specifies a horizontal distance between the center of each of the cameras 172 and the center of the central object 160. The camera offset 134 is described in greater detail in conjunction with FIGS. 2 and 3.

As shown, a navigation application 150 that resides in the memory 116 and executes on the processor 112 receives the detection dataset 142 and the camera offset 134. The navigation application 150 performs any number and type of navigation-based operations that, subsequently, cause the central object 160 to perform an action based on the detection dataset 142. For instance, in some embodiments, the central object 160 is a steerable speaker and the navigation application 150 receives the detection dataset 142 specifying the two-dimensional position coordinates of a detected person relative to the camera 172(1). As described in conjunction with FIG. 3, the navigation application 150 computes a detected object position relative to the center of the central object 160 based on the two-dimensional position coordinates relative to the camera 17291) and the camera offset 134. The navigation application 150 subsequently configures the steerable speaker to point towards the detected person based on the detected object position relative to the center of the central object 160.

It will be appreciated that the object detection system 100 shown herein is illustrative and that variations and modifications are possible. The number of compute instances 110, the number of crossfire camera systems 170, the number and type of applications, and the connection topology between the various units in object detection system 100 may be modified as desired. In particular, the crossfire camera system 170 may include any number and type of cameras 172, where at least two of the cameras 172 are positioned and oriented in a crossfire configuration. Each of the object detection application 140 and the navigation application 150 may be implemented in a stand-alone fashion or integrated in any other application or device (e.g., the central object 160) in any technically feasible fashion. Further, the functionality included in the object detection application 140 and the navigation application 150 may be divided across any number of applications that are stored and executed via any number of devices that are located in any number of physical positions. In various embodiments, the object detection application 140 and/or the navigation application 150 may be omitted from the object detection system 100 and/or replaced with any number and type of other applications.

Note that the techniques described herein are illustrative rather than restrictive, and may be altered without departing from the broader spirit and scope of the embodiments. Many modifications and variations will be apparent to those of ordinary skill in the art without departing from the scope and spirit of the described embodiments and techniques. As a general matter, the techniques outlined herein are applicable to any camera system that includes at least two cameras positioned and oriented in a crossfire configuration.

Coverage Areas Associated with the Crossfire Camera System

FIG. 2 illustrates an example of a crossfire camera pair 260(1) included in the crossfire camera system 170 of FIG. 1, according to various embodiments. For explanatory purposes only, the crossfire camera pair 260(1) includes, without limitation, the cameras 172(1) and 172(2). Crossfire definitions 210 depict the relationships between the cameras 172(1) and 172(2) included in the crossfire camera pair 260. As shown, the crossfire camera pair 260 is associated with a rotation angle 222, a rotation x shift 232, and a rotation y shift 234.

As persons skilled in the art will recognize, theoretically if the length and width of each of the cameras 172(1) and 172(2) were zero, then the cameras 172(1) and 172(2) could be positioned and oriented in a conventional camera arrangement 202 to detect objects over an angle of view equal to 180 degrees without any blind spots. However, because the lengths and widths of the cameras 172(1) and 172(2) are greater than zero, the cameras 172(1) and 172(2) are deployed as the crossfire camera pair 260(1) to detect objects over a crossfire angle of view (not shown in FIG. 2) of at least 180 degrees without any blind spots. In general, the rotation angle 222 associated with the crossfire camera pair 260 is at least one degree. For explanatory purposes only, the rotation angle 222(1) associated with the crossfire camera pair 260(1) is two degrees.

More precisely, the camera 172(1) rotates from a camera location without rotation 240 through the rotation angle 222 in a counter-clockwise direction to a position and orientation within a coverage area 270(1) associated with the camera 172(2). In a complementary fashion, the camera 172(2) rotates from the camera location without rotation 240 through the rotation angle 222 in a clockwise direction to a position and orientation within the coverage area 270(1) associated with the camera 171(1). As a result of the camera cross-rotation 220, the position of the camera 172(1) shifts to the left by the rotation x shift 232, the position of the camera 172(2) shifts to the right by the rotation x shift 232, and the positions of both the cameras 172(1) and 172(2) shift forward by the rotation y shift 234.

The central object center 250 is the center of the central object 160. After the camera cross-rotation 220, the center of the crossfire camera pair 260 is positioned and oriented to be co-located with the crossfire object center 250. Accordingly, the central object center 250 lies midway between the camera 172(1) and 172(2) from left to right, the camera offset 134 is equal to the rotation x shift 232, and the central object center 250 is in front of a camera location without rotation 240 by the rotation y shift 234.

For explanatory purposes only, the conventional camera pair 202 illustrates a theoretical configuration in which the camera 172(1), the camera 172(2), the camera location without rotation 240, and the central object center 250 are co-located. The rotation angle 220(0) is 0 degrees, the rotation x shift 232 is 0, and the rotation y shift 234 is 0. By contrast, the crossfire camera pair 260(1) illustrates a crossfire configuration in which the camera 172(1) is positioned within the coverage area 270(2) associated with the camera 172(2) and the camera 172(2) is positioned within the coverage area 270(1) associated with the camera 172(1). The rotation angle 222(1) is two degrees, the rotation x shift 232 is 0.349, and the rotation y shift 234 is 0.0122.

Importantly, when the rotation angle 222 is greater than zero, the camera 172(2) has the coverage area 270(2) that at least partially overlaps the coverage area 270(1) associated with the camera 172(1). The union of the coverage areas 220(1) and 220(2) has a crossfire angle of view (not shown in FIG. 2) that is equal to the sum of 180 degrees and two times the rotation angle 222. In addition, as persons skilled in the art will recognize, an angle between the center axis of the angle of view of the camera 172(1) and the center axis of the angle of view of the camera 172(2) exceeds the angle of view associated with the camera 172(1).

In various embodiments, the crossfire camera pair 260 may be associated with any rotation angle 222 and the corresponding rotation x shift 232 and rotation y shift 234. For example, the rotation x shift 232 and the rotation y shift 234 may be determined using the following equations (1) and (2):

$$x = \left(\frac{r}{2} * \tan\left(\theta * \frac{\pi}{180}\right)\right) \quad (1)$$

$$y = \left(x * \tan\left(\theta * \frac{\pi}{180}\right)\right) \quad (2)$$

In equations (1) and (2), x is the rotation x shift 232, θ is the rotation angle 222, y is the rotation y shift 234, and r is an original maximum detection range (not shown in FIG. 2). The original maximum detection range is depicted in FIG. 3.

Accordingly, the following "rotation table" specifies five different configuration for the crossfire camera pair 260 associated with five different rotation angles 222 for an original maximum detection range equal to 20 feet:

| Rotation Angle 222 | Rotation Y Shift 234 | Rotation X Shift 232 |
|---|---|---|
| 1 | 0.003047 | 0.174551 |
| 2 | 0.012195 | 0.349207 |
| 3 | 0.027466 | 0.524077 |
| 4 | 0.048898 | 0.699268 |
| 5 | 0.076543 | 0.874886 |

Note:
this table is based on an original maximum detection range equal to 20 feet.

FIG. 3 is a more detailed illustration of the crossfire camera pair 260(1) of FIG. 2, according to various embodiments. As shown, the crossfire camera pair 260(1) has a crossfire angle of view 310 that is the union of the coverage area 220(1) associated with the camera 172(1) and the coverage area 220(2) associated with the camera 172(2). The crossfire angle of view 130 is equal to the sum of 180 degrees and two times the rotation angle 222.

As persons skilled in the art will recognize, when the camera 172(x) is included in the crossfire camera pair 260 associated with the rotation angle 222 greater than zero, both a maximum side range 330 and a maximum front range 340 are less than an original maximum detection range 320. The maximum side range 330 specifies a maximum distance from the central object center 250 for which the camera 172(x) can effectively capture images to the side of the central object 160. In a complementary fashion, a maximum front range 340 specifies a maximum distance from the central object center 250 for which the camera 172(x) can effectively capture images in front of the central object 160. The maximum side range 330 and the maximum front range 340 may be computed using trigonometry.

The maximum side range 330 may be computed using the following equation (3), depicted in FIG. 3 as maximum side range calculation 332:

$$d = (r - \sqrt{x^2 + y^2}) \cos \theta \quad (3)$$

In equation (3), d is the maximum side range 330, r is the original maximum detection range 320, x is the rotation x shift 232, y is the rotation y shift 234, and θ is the rotation angle 222.

Similarly, the maximum front range 340 may be computed using the following equation (4), depicted in FIG. 3 as maximum front range calculation 342:

$$f = r - y \quad (4)$$

In equation (4), f is the maximum front range 340, r is the original maximum detection range 320, and y is the rotation y shift 234.

As persons skilled in the art will recognize a designer or a computer-aided design (CAD) application may compute the maximum side range 330 and the maximum front range 340 based on the rotation angle 222 and the original maximum detection range 320. For example, as part of a design process, a designer or a CAD application could compute the following "range table" for the cameras 172 based on the original maximum detection range 320 r=20 feet:

| Rotation Angle 222 | Maximum Side Range 230 | Maximum Front Range 240 |
|---|---|---|
| 1 | 19.822403 | 19.996953 |
| 2 | 19.638609 | 19.987805 |
| 3 | 19.448513 | 19.972534 |
| 4 | 19.252014 | 19.951102 |
| 5 | 19.049008 | 19.923457 |

Note:
this table is based on the original maximum detection range 320 r equal to 20 feet.

The designer could position and orient the cameras 172 based on the rotation table described in conjunction with FIG. 2 and a desired rotation angle 222. For example, for the rotation angle 222 of 4 degrees, the designer could position the cameras 172(1) and 172(2) as per the camera offset 134 (equal to the rotation x shift 234) of 0.699268. Subsequently, the designer or the CAD application could compute the maximum side range 230 of 19.252013 and the maximum front range 240 of 19.951102.

In some embodiments, the designer, the object detection application 140, the navigation application 150, or a CAD application computes the coordinates of a detected object (not shown) relative to the central object center 250 based on the camera image 174(x) acquired from one of the cameras 172(x). For instance, in some embodiments, the designer, the object detection application 140, the navigation application 150, or a CAD application implements the following equation (5), depicted as a detected object position calculation 352:

$$(a', b') = (a - x, b) \quad (5)$$

In equation (5), (a', b') are the coordinates of a detected object relative to the central object center 250, (a, b) are coordinates detected based on the camera image 174(1) acquired from the camera 172(1), and x is the camera offset 134.

FIG. 4 illustrates an example of a combined coverage area 410 surrounding the central object 160 of FIG. 1, according to various embodiments. Although not shown in FIG. 4, the cameras 172(1) and 172(2) are included in the crossfire camera pair 260(1) and the cameras 172(3) and 172(4) are included in the crossfire camera pair 260(2). The crossfire camera pair 260(1) and the crossfire camera pair 260(2) are co-located. More precisely and as shown, the cameras 172(1) and 172(4) are co-located, and the cameras 172(2) and 172(3) are co-located. Further, the cameras 172(1), 172(2), 172(3), and 172(4) are equidistant from the central object center 250.

The coverage area 220(1) is associated with the camera 172(1), the coverage area 220(2) is associated with the camera 172(2), the coverage area 220(3) is associated with the camera 172(3), and the coverage area 220(4) is associated with the camera 172(4). As shown, the union of the coverage areas 220(1), 220(2), 220(3), and 220(4) is the combined coverage area 410. Note that the combined coverage area 410 resembles an ellipse. Advantageously, the combined coverage area 410 is associated with a combined angle of view 420 of 360 degrees and has no blind spots.

Figure 5:
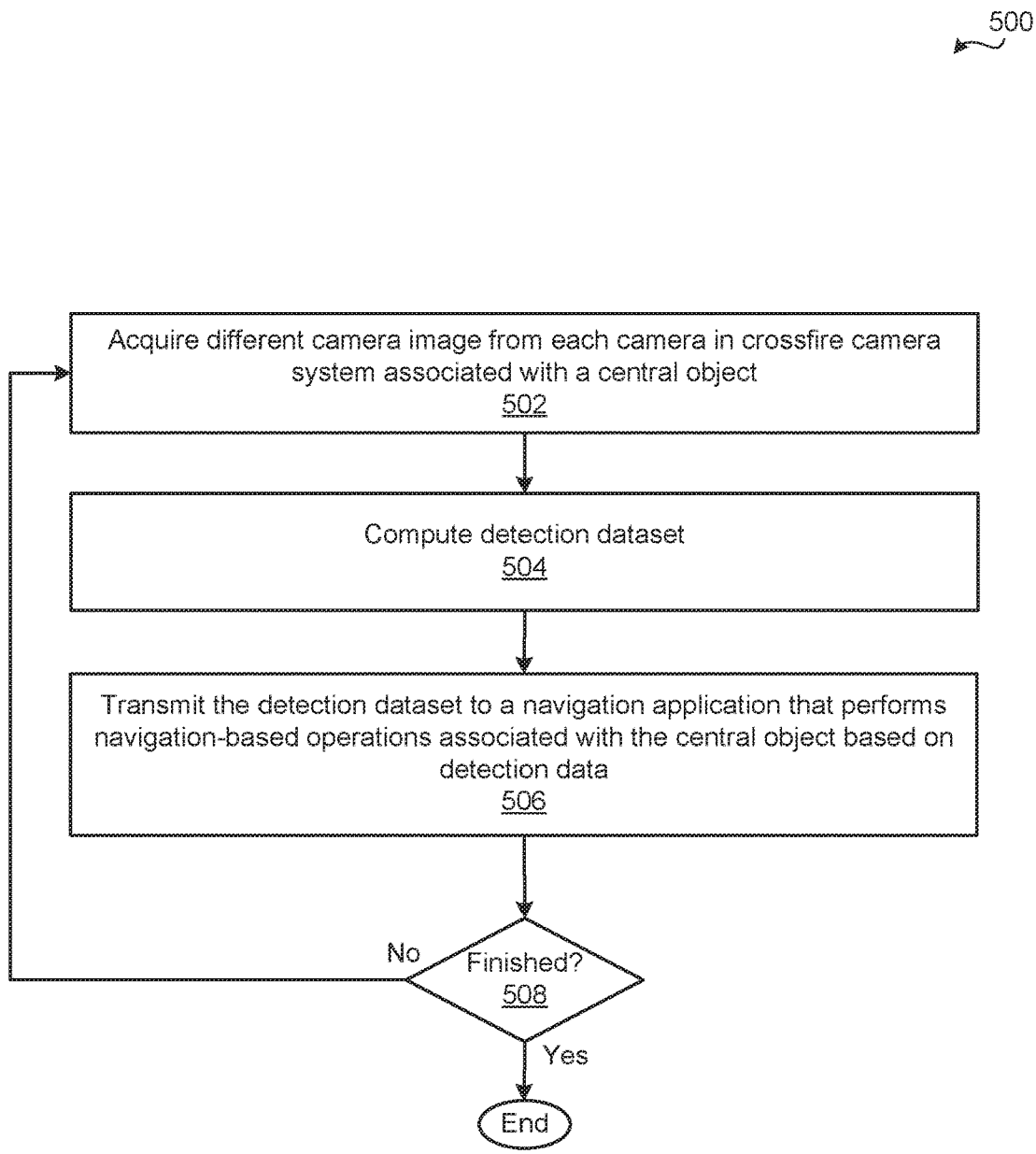
FIG. 5 is a flow diagram of method steps for detecting objects, according to various embodiments.

FIG. 5 is a flow diagram of method steps for detecting objects, according to various embodiments. Although the method steps are described in conjunction with the systems of FIGS. 1-4, persons skilled in the art will understand that any system configured to implement the method steps, in any order, falls within the scope of the contemplated embodiments.

As shown, a method 500 begins at step 502, where the object detection application 140 acquires the camera images 174(1)-174(N) from, respectively, the cameras 172(1)-172(N) associated with the central object 160. At step 504, the object detection application 140 performs any number and type of object detection operations on the camera images 174 to generate the detection dataset 142. At step 506, the object detection application 140 transmits the detection dataset 142 to the navigation application 150. The navigation application 150 performs any number and combination of navigation-based operations associated with the central object 160 based on the detection dataset 142. At step 508, the object detection application 140 determines whether the object detection application 140 is to finish operating. If, at step 506, the object detection application 140 determines that the object detection application 140 is to finish operating (e.g., the cameras 174 have powered down), then the method 500 terminates. If, however, at step 506, the object detection application 140 determines that the object detection application 140 is to continue operating, then the method 500 returns to step 502, where the object detection application 140 acquires new camera images 174.

In sum, the disclosed systems and techniques may be used to perform object detection. In some embodiments, an object detection system includes, without limitation, a camera system mounted on a central object, an object detection application, and a navigation application. The camera system includes, without limitation, two pairs of cameras. The two cameras in each pair of cameras are positioned and oriented in a crossfire configuration. When a pair of cameras A and B is in a crossfire configuration, the angle between the center axis of the angle of view of the camera A and the center axis of the angle of view of the camera B exceeds the angle of view of the camera A.

Together, the two cameras in each pair of cameras cover an angle of view that is greater than 180 degrees without blind spots, and the four cameras included in the camera system cover a 360 degree angle of view without blind spots. The object detection application performs object detection operations based on four camera images received from the four cameras to generate a detection dataset that specifies detected positions of any number of detected objects. Subsequently, the steering application performs any number and type of navigation and/or steering operations associated with the central object based on the detection dataset.

At least one advantage of the disclosed approach is that the number of cameras, the amount of processing resources, and the power consumption associated with reliably detecting objects are reduced compared to conventional approaches that involve consolidating images from multiple cameras. In particular, arranging pairs of cameras in a crossfire configuration reduces the number of cameras required to detect objects over a combined angle of view without blind spots. Further, unlike conventional solutions, the disclosed approach does not involve generating a panoramic image based on the camera images acquired from the cameras prior to performing object detection operations. Reducing the number of cameras and eliminating the image processing operations associated with generating a panoramic image substantially reduces the processing resources and power required to perform object detection.

1. In some embodiments, a camera system comprises a first camera having a first camera angle of view, wherein the first camera is positioned and oriented to have a first coverage area; and a second camera having a second camera angle of view, wherein the second camera is positioned and oriented to have a second coverage area that at least partially overlaps the first coverage area, wherein an angle between a center axis of the first camera angle of view and a center axis of the second camera angle of view exceeds the first camera angle of view.

2. The camera system of clause 1, wherein a union of the first coverage area and the second coverage area has at least a 180 degree angle of view.

3. The camera system of clauses 1 or 2, further comprising a third camera having a third camera angle of view, wherein the third camera is positioned and oriented to have a third coverage area that at least partially overlaps the second coverage area; and a fourth camera having a fourth camera angle of view, wherein the fourth camera is positioned and oriented to have a fourth coverage area that at least partially overlaps the third coverage area, wherein an angle between a center axis of the third camera angle of view and a center axis of the fourth camera angle of view exceeds the third camera angle of view.

4. The camera system of any of clauses 1-3, wherein the first camera and the fourth camera are co-located, and the second camera and the third camera are co-located.

5. The camera system of any of clauses 1-4, further comprising a third camera and a fourth camera, wherein a combined coverage area that is a union of the first coverage area, the second coverage area, a third coverage area associated with the third camera, and a fourth coverage area associated with the fourth camera corresponds to a 360 degree combined angle of view.

6. The camera system of any of clauses 1-5, wherein the first camera angle of view is no greater than 90 degrees.

7. The camera system of any of clauses 1-6, wherein the first camera is mounted on a central object at a first position to provide a maximum side range that is computed based on an original maximum detection range and a rotation angle associated with the first camera.

8. The camera system of any of clauses 1-7, wherein the first camera and the second camera are mounted on a speaker, a vehicle, or a drone.

9. The camera system of any of clauses 1-8, further comprising a third camera and a fourth camera, wherein the first camera, the second camera, the third camera, and the fourth camera are mounted on a speaker, a vehicle, or a drone.

10. The camera system of any of clauses 1-9, further comprising a third camera and a fourth camera, wherein a first image acquired from the first camera, a second image acquired from the second camera, a third image acquired from the third camera, and a fourth image acquired from the fourth camera are transmitted to an object detection application.

11. In some embodiments, a method comprises acquiring a first image from a first camera, wherein the first camera is positioned and oriented to have a first coverage area; acquiring a second image from a second camera, wherein the second camera is positioned and oriented within the first coverage area to have a second coverage area that at least partially overlaps the first coverage area; acquiring a third image from a third camera, wherein the third camera is positioned and oriented to have a third coverage area that at least partially overlaps the second coverage area; acquiring a fourth image from a fourth camera, wherein the fourth camera is positioned and oriented within the third coverage area to have a fourth coverage area that at least partially overlaps the third coverage area; and performing at least one object detection operation based on first image, the second image, the third image, and the fourth image to generate a detection dataset that specifies a detected position of a detected object.

12. The method of clause 11, wherein the first camera, the second camera, the third camera, and the fourth camera are associated with a central object, and further comprising causing the central object to perform at least one navigation-based activity based on the detection dataset.

13. The method of clauses 11 or 12, wherein the first camera, the second camera, the third camera, and the fourth camera are associated with a central object, and further comprising computing a distance between the central object and the detected object based on the detected position and a camera offset between the first camera and the central object.

14. The method of any of clauses 11-13, wherein the first camera and the fourth camera are co-located, and the second camera and the third camera are co-located.

15. The method of any of clauses 11-14, wherein the first camera, the second camera, the third camera, and the fourth camera are equidistant from a center of a central object.

16. The method of any of clauses 11-15, wherein a combined coverage area that is a union of the first coverage area, the second coverage area, the third coverage area, and the fourth coverage area corresponds to a 360 degree combined angle of view.

17. In some embodiments, an object detection system comprises a first camera having a first camera angle of view, wherein the first camera is positioned and oriented to have a first coverage area; and a second camera having a second camera angle of view, wherein the second camera is positioned and oriented to have a second coverage area that at least partially overlaps the first coverage area, wherein an angle between a center axis of the first camera angle of view and a center axis of the second camera angle of view exceeds the first camera angle of view; a memory storing an object detection application; and a processor coupled to the memory, wherein when executed by the processor, the object detection application configures the processor to perform at least one object detection operation based on at least a first image acquired from the first camera and a second image acquired from the second camera to generate a detection dataset that specifies a detected position of a detected object.

18. The object detection system of clause 17, further comprising a third camera having a third camera angle of view, wherein the third camera is positioned and oriented to have a third coverage area that at least partially overlaps the second coverage area; and a fourth camera having a fourth camera angle of view, wherein the fourth camera is positioned and oriented to have a fourth coverage area that at least partially overlaps the third coverage area, wherein an angle between a center axis of the third camera angle of view and a center axis of the fourth camera angle of view exceeds the third camera angle of view.

19. The object detection system of clauses 17 or 18, wherein a combined coverage area that is a union of the first coverage area, the second coverage area, the third coverage area, and the fourth coverage area is associated with a 360 degree combined angle of view.

20. The object detection system of any of clauses 17-19, wherein the first camera and the second camera are mounted on a speaker, a vehicle, or a drone.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A camera system, the camera system comprising:
a first camera having a first camera angle of view, wherein the first camera is positioned and oriented to have a first coverage area; and
a second camera having a second camera angle of view, wherein the second camera is positioned and oriented to have a second coverage area that at least partially overlaps the first coverage area, wherein an angle between a center axis of the first camera angle of view and a center axis of the second camera angle of view exceeds both the first camera angle of view and the second camera angle of view, wherein the first camera is within the second coverage area, and wherein the second camera is within the first coverage area.

2. The camera system of claim 1, wherein a union of the first coverage area and the second coverage area has at least a 180 degree angle of view.

3. The camera system of claim 1, further comprising:
a third camera having a third camera angle of view, wherein the third camera is positioned and oriented to have a third coverage area that at least partially overlaps the second coverage area; and
a fourth camera having a fourth camera angle of view, wherein the fourth camera is positioned and oriented to have a fourth coverage area that at least partially overlaps the third coverage area, wherein an angle between a center axis of the third camera angle of view and a center axis of the fourth camera angle of view exceeds the third camera angle of view.

4. The camera system of claim 3, wherein the first camera and the fourth camera are co-located, and the second camera and the third camera are co-located.

5. The camera system of claim 1, further comprising a third camera and a fourth camera, wherein a combined coverage area that is a union of the first coverage area, the second coverage area, a third coverage area associated with the third camera, and a fourth coverage area associated with the fourth camera corresponds to a 360 degree combined angle of view.

6. The camera system of claim 1, wherein the first camera angle of view is no greater than 90 degrees.

7. The camera system of claim 1, wherein the first camera is mounted on a central object at a first position to provide a maximum side range that is computed based on an original maximum detection range and a rotation angle associated with the first camera.

8. The camera system of claim 1, wherein the first camera and the second camera are mounted on a speaker, a vehicle, or a drone.

9. The camera system of claim 1, further comprising a third camera and a fourth camera, wherein the first camera, the second camera, the third camera, and the fourth camera are mounted on a speaker, a vehicle, or a drone.

10. The camera system of claim 1, further comprising a third camera and a fourth camera, wherein a first image acquired from the first camera, a second image acquired from the second camera, a third image acquired from the third camera, and a fourth image acquired from the fourth camera are transmitted to an object detection application.

11. A method for detecting objects, the method comprising:
acquiring a first image from a first camera, wherein the first camera has a first camera angle of view and is positioned and oriented to have a first coverage area;
acquiring a second image from a second camera, wherein the second camera has a second camera angle of view and is positioned and oriented within the first coverage area to have a second coverage area that at least partially overlaps the first coverage area, wherein an angle between a center axis of the first camera angle of view and a center axis of the second camera angle of view exceeds both the first camera angle of view and the second camera angle of view, wherein the first camera is within the second coverage area;
acquiring a third image from a third camera, wherein the third camera is positioned and oriented to have a third coverage area that at least partially overlaps the second coverage area;
acquiring a fourth image from a fourth camera, wherein the fourth camera is positioned and oriented within the third coverage area to have a fourth coverage area that at least partially overlaps the third coverage area; and
performing at least one object detection operation based on the first image, the second image, the third image, and the fourth image to generate a detection dataset that specifies a detected position of a detected object.

12. The method of claim 11, wherein the first camera, the second camera, the third camera, and the fourth camera are associated with a central object, and further comprising causing the central object to perform at least one navigation-based activity based on the detection dataset.

13. The method of claim 11, wherein the first camera, the second camera, the third camera, and the fourth camera are associated with a central object, and further comprising computing a distance between the central object and the detected object based on the detected position and a camera offset between the first camera and the central object.

14. The method of claim 11, wherein the first camera and the fourth camera are co-located, and the second camera and the third camera are co-located.

15. The method of claim 11, wherein the first camera, the second camera, the third camera, and the fourth camera are equidistant from a center of a central object.

16. The method of claim 11, wherein a combined coverage area that is a union of the first coverage area, the second coverage area, the third coverage area, and the fourth coverage area corresponds to a 360 degree combined angle of view.

17. An object detection system, the object detection system comprising:
a first camera having a first camera angle of view, wherein the first camera is positioned and oriented to have a first coverage area; and
a second camera having a second camera angle of view, wherein the second camera is positioned and oriented to have a second coverage area that at least partially overlaps the first coverage area, wherein an angle between a center axis of the first camera angle of view and a center axis of the second camera angle of view exceeds both the first camera angle of view and the second camera angle of view, wherein the first camera is within the second coverage area, and wherein the second camera is within the first coverage area;

a memory storing an object detection application; and a processor coupled to the memory, wherein when executed by the processor, the object detection application configures the processor to perform at least one object detection operation based on at least a first image acquired from the first camera and a second image acquired from the second camera to generate a detection dataset that specifies a detected position of a detected object.

18. The object detection system of claim 17, further comprising:

a third camera having a third camera angle of view, wherein the third camera is positioned and oriented to have a third coverage area that at least partially overlaps the second coverage area; and a fourth camera having a fourth camera angle of view, wherein the fourth camera is positioned and oriented to have a fourth coverage area that at least partially overlaps the third coverage area, wherein an angle between a center axis of the third camera angle of view and a center axis of the fourth camera angle of view exceeds the third camera angle of view.

19. The object detection system of claim 18, wherein a combined coverage area that is a union of the first coverage area, the second coverage area, the third coverage area, and the fourth coverage area is associated with a 360 degree combined angle of view.

20. The object detection system of claim 17, wherein the first camera and the second camera are mounted on a speaker, a vehicle, or a drone.

* * * * *